Patented July 16, 1940

2,208,551

UNITED STATES PATENT OFFICE

2,208,551

QUICK-DRYING STAMP-PAD INK

Campbell E. Waters, Washington, D. C., assignor to the Government of the United States of America, represented by the Secretary of Commerce and his successors in office No Drawing. Application July 5, 1938, Serial No. 217,432

1 Claim. (Cl. 134—34)

(Granted under the act of March 3, 1883, as amended April 30, 1928; 370 O. G. 757)

This invention may be made and used by or for the Government of the United States without payment to me of any royalty therefor.

The present invention relates to quick-drying stamp-pad inks and aims generally to improve the same.

Most of the inks intended for use with rubber stamps are solutions of dyes in a solvent that will not dry on the pad on which the stamp is inked. The solvent is generally a mixture of glycerol and water, because glycerol, in addition to being practically nonvolatile at ordinary temperatures, is hygroscopic and never becomes completely dehydrated under atmospheric conditions.

Ink made with glycerol and water changes in fluidity according to the relative humidity of the atmosphere. It is a common complaint that it becomes watery in summer, when the air is apt to be highly humid. In cold weather, in heated buildings, the relative humidity of the air is low, and then the ink loses a large part of its water.

It thus happens that impressions made with the ink on paper dry slowly at all seasons: in summer, because the stamp takes from the pad such a large quantity of the watery ink that it takes a long time to sink into paper, for there is little or no evaporation of water from it; in winter, because the relatively concentrated and viscous ink does not readily sink into paper. If many papers must be stamped in quick succession and the ink dries slowly, the impressions may be made unsightly, or even illegible, by smearing. This state of affairs has created a demand for quick-drying inks.

There are various formulas for stamping inks made with oils, instead of with glycerol and water. They dry rapidly by being absorbed by the paper, but they can be used safely only with metal stamps, on account of the harmful effect of oils upon rubber. There are also formulas which require the use of alcohol or of ethyl acetate in a mixture of glycerol and water. Alcohol and ethyl acetate are much more volatile than water, but their rapid evaporation plays only a minor part in the drying of impressions made on paper. If a drop of water is put on a piece of good writing paper, it sinks in slowly. If a drop of alcohol, of ethyl acetate, or of several similar organic liquids that might be used in ink, is put on the paper, it is absorbed almost instantly, spreads, and shows as a wet spot on the opposite side of the paper. If successive small portions of one of these liquids, for instance alcohol, are added to a mixture of glycerol and water, which contains dissolved dye, a point will be reached at which absorption by paper is rapid. If impressions are made on paper, there will be a narrow range within which the only marked effect of adding more alcohol is to increase the rate of drying by absorption. Beyond this range, with more and more alcohol, the impressions lose their sharpness, and may become blurred to illegibility. The amount of alcohol that must be used to noticeably increase the rate of drying, or that can be added without causing blurred impressions, depends greatly upon the paper.

Moreover, when spread on a stamp pad, ink containing alcohol, ethyl acetate, or other similar liquid, becomes less and less quick-drying because of the evaporation of the volatile solvent, and this disadvantage of the penetrant stamp pad inks has come to be regarded as characteristic of them because of the belief that liquids of considerable volatility had to be employed to obtain the penetrant result.

By the present invention, however, a quick-drying stamp-pad ink is provided in which the penetrant is of low volatility and this disadvantage is eliminated.

Broadly, the present invention contemplates the provision of a quick-drying stamp pad ink comprising an alkyl ether of diethylene glycol. Diethylene glycol monobutyl ether (butyl carbitol, B. P. 231° C.) is preferred, but under many conditions the diethylene glycol monomethyl ether (methyl carbitol, B. P. 193° C.) or the diethylene glycol monoethyl ether (carbitol B. P. 202° C.) are found to give satisfactory results, and in all cases a great improvement is attained as compared with the types of stamp pad ink heretofore available. For use with relatively absorbent paper, for example, twenty-five per cent rag bond, scratch pad paper, and the like, it is desirable to add a constituent to prevent undesirable blurring, and it has been found that in combination with this group of high boiling point ethers, glycerol (B. P. 290° C.) serves such purpose to advantage.

In developing and testing the present invention comparative tests were made as follows:

(a) Five separate test compositions to be compared were prepared, namely:

1. A mixture of equal volumes of glycerol and water.
2. The same as 1, with one-third its volume of carbitol.
3. The same as 1, with one-third its volume of butyl carbitol.
4. Carbitol.
5. Butyl carbitol.

Two-gram portions of these liquids were put in glass crystallizing dishes of about 48 mm. inside diameter. In a dish of this size, if the bottom were perfectly flat and there were no meniscus, 2 g. of water would make a layer 1.1 mm. deep. The five liquids made layers of depths slightly different from 1.1 mm. A 2 g. sample of any of the liquids is enough to show definite changes in weight, and in a layer about 1 mm. deep it responds more quickly to variations in atmospheric humidity than if it is in a deeper layer.

The first series of tests was conducted over a period of 51 days. There was a steady loss in weight of all the liquids, except when the relative humidity was very high. The mixture of glycerol and water lost 772 of the 930 mg. of water it contained at the start. Butyl carbitol is hygroscopic, but it is also slightly volatile, and the 2 g. lost 224 mg. Because of its volatility, the mixture of glycerol and water to which it was added lost a total of 833 mg. The carbitol lost 773 mg., and its mixture with glycerol and water, 914 mg.

(b) A second series of tests was made in the same way as before, with the following liquids:

1. A mixture of equal volumes of glycerol and water.
2. The same as 1, with one-fourth its volume of butyl carbitol.
3. The same as 1, with one-fourth its volume of 95-percent ethyl alcohol.
4. A sample of ink according to the present invention made by dissolving the dye fuchsine in the same mixture as 2.
5. A commercial ink made with glycerol, and containing ethyl acetate.

This series of tests was continued for 14 days, during most of which time the indoor air was very dry, so all the liquids lost most of the water they contained at the start. The mixture to which ethyl alcohol had been added and the commercial ink lost their volatile solvents, which would have occurred even with high relative humidity.

During the 2 weeks, the glycerol and water lost 882 mg., or about 95 per cent of the water the mixture contained originally. The residue would almost have met the requirement of the United States Pharmacopoeia, that glycerol shall contain about 96 per cent of the anhydrous substance. Liquids 2 and 4, of which butyl carbitol comprised one-fifth the volume, lost 812 and 809 mg., respectively. The alcohol mixture lost 1,055 mg. The viscosity of the commercial ink had already led to the suspicion that it contained more glycerol than 4, and its loss of 840 mg. may be explained on this basis. The combined weights of water and ethyl acetate in the commercial ink might have been less than the combined weights of water and butyl carbitol in 4, yet the commercial ink could have shown the greater loss, on account of the low volatility of butyl carbitol.

(c) In comparing the behavior on stamp pads of the sample of ink according to the present invention and the commercial ink, the same volume of each was applied to pieces of blotting paper, 44 by 50 mm. Impressions were made with a rubber dating stamp nearly every day for 19 days, on Government letter paper (25 per cent rag bond) and on scratch-pad paper. With few exceptions, the impressions made with the sample of ink of this invention were not smeared when rubbed immediately with the tips of the fingers. By the same test the commercial ink was sometimes not dry half a minute or more after the impressions were made.

(d) In determining the preferred range and most preferred embodiment of proportions of the new ink of this invention, a series of tests were made with inks prepared by adding increasing amounts of butyl carbitol to a solution of dye in a mixture of equal volumes of glycerol and water. Small pads of felt were inked, and impressions were made from them for a month. When 1 volume of butyl carbitol was added to 5 volumes of the dye solution, the impressions made with the ink dried rapidly, and when the proportion of dye solution was reduced to 3 volumes, there was no material feathering of the impressions. The above cited example, test "b" sample 4, of ink according to this invention, with 1 volume of butyl carbitol and 4 volumes of dye solution, is midway between these two. It was given a practical trial in different offices in a large establishment and has been found excellent in service. For example in the mail and files room thereof, where thousands of letters are stamped every month, a pad used continuously for four months, during most of which time the lid of the box holding the pad was not closed, was still yielding satisfactory results at the end of such period, with only two re-inkings, one about a month after it was put in service, and the other about two months later. The tests made demonstrate clearly that the new inks of this invention do not saturate the pads with non-drying glycerol nearly as soon as the commercial glycerol-water-dye-alcohol inks.

(e) The new ink is preferably made by dissolving dye in a mixture of say, equal volumes, of glycerol and water, filtering the solution if necessary, and adding to it one-fourth its volume of butyl carbitol. Before the final mixing, there is apt to be some evidence of precipitation of dye at the boundary between the glycerol-water and the butyl carbitol. For this reason it seems advisable in general to make the ink in the way outlined, instead of dissolving the dye in the mixture of the three liquids.

To make 1 liter of ink, according to the preferred embodiment of the invention, there will be required 400 ml. each of glycerol and water, an 200 ml. of butyl carbitol. When the first two are mixed, the total volume is a little less than 800 ml., and there is no doubt a further contraction when the third liquid is added. The total contraction is probably overcompensated by the volume of the dye. The weight of dye to be used depends largely upon its color strength. Some dyes that have made inks of satisfactory depth of color when used in the amounts stated, per liter, are listed here. Their colour index numbers are given for better identification.

| Dye name | Colour index No.— | Grams per liter |
|---|---|---|
| Fuchsine (magenta) | 677 | 16 |
| Light green SF | 670 | 32 |
| Methyl cotton blue | 706 | 24 |
| Crystal violet | 681 | 16 |
| Nigrosine | 865 | 48 |

For making the ink in quantity, say by gallon, it is pointed out that 8 g. in 1 liter is equivalent to 1.0688 avdp. oz./gal. All the weights of dye in the table are whole multiples of 8, so the amount of each dye required for 1 gal. of ink can be found with little trouble. The concentrated forms of the dyes should be used. It is a common practice to mix colorless diluents with dyes before they are sold, so each new lot of dye bought should be tested to find out whether it has satisfactory color strength. If not, more of it must be used in a given volume of solvent. A newly inked pad will sometimes dry out so much in the first day or two that it must be given more ink, but after this there is usually no trouble experienced with it. For use indoors in winter, when the relative humidity of the air is low, the ink may be made with a mixture of 2 volumes of glycerol and 1 of water. In this case the proportion of butyl carbitol should be increased to about one-third the volume of the solution of dye, so that the finished ink will still contain about 1 volume of butyl carbitol to 2 volumes of glycerol. A less hygroscopic ink will be preferable in summer, however.

Because the ink dries almost entirely by being absorbed, the rubber stamp should not be inked too heavily, especially if the characters are large, with heavy lines, and if the stamping is done on thin paper.

(f) As above mentioned for ordinary, relatively absorbent papers, it is desirable to use a constituent to prevent undesirable blurring or feathering, and the glycerol, in the new combination, serves this purpose as well as being sufficiently hygroscopic so that it never becomes completely dehydrated under atmospheric conditions. Thus, for general purposes, the ink preferably comprises a substantial proportion of glycerol as well as such quantity of one or more of the monoalkyl ethers of diethylene glycol which have the ability to serve as penetrants when dissolved in the glycerol-water solution, as to give the desired quick-drying action. The ratio of glycerol to such penetrant rarely need exceed two to one even for highly absorbent papers, and the proportion of glycerol may be greatly reduced or even entirely eliminated for special purpose work.

(g) Tests similar to the above have shown that methyl carbitol and ethyl carbitol are both efficient penetrant constituents of quick-drying stamp-pad ink according to this invention, but in general the higher alkyl carbitols are less volatile than the lower ones and for this reason I prefer to use the butyl carbitol which is now readily obtainable commercially.

In accordance with the patent statutes there is herein described the principle and operation of my invention, together with examples which I now consider to represent the best embodiment thereof, but it is to be understood that the examples set forth are only illustrative and not to be considered as restrictive of the scope of the invention.

I claim:

A quick-drying penetration-type stamp-pad ink consisting of a solution of about two parts of glycerol in two parts of water, the glycerol acting as a mildly hygroscopic and anti-feathering constituent; a glycerol soluble dye dissolved in the solution; and a somewhat hygroscopic penetrant consisting of about one part monobutyl ether of diethylene glycol combined in the solution and acting to carry the glycerol-dye solution into the paper; said ink characterized in that it retains over long periods of exposure on a stamp-pad the capability of quick-drying at room temperature by penetration of paper, that it does not saturate the stamp-pad with non-drying glycerol as do high-volatile penetrant stamp-pad inks, that it is not injurious to rubber stamps, and that its said characteristics are retained when exposed on the pad under both winter and summer conditions of humidity.

CAMPBELL E. WATERS.